US011990030B2

(12) United States Patent
Moreno et al.

(10) Patent No.: US 11,990,030 B2
(45) Date of Patent: May 21, 2024

(54) AUDIO TONE ASSISTED RCU PROGRAMMING

(71) Applicant: ARRIS Enterprises LLC, Suwanee, GA (US)

(72) Inventors: Cesar Moreno, Santa Rosa Beach, FL (US); Navneeth Kannan, Doylestown, PA (US); William Ryan, Los Angeles, CA (US)

(73) Assignee: ARRIS ENTERPRISES LLC, Horsham, PA (US)

( * ) Notice: Subject to any disclaimer, the term of this patent is extended or adjusted under 35 U.S.C. 154(b) by 0 days.

(21) Appl. No.: 17/723,787

(22) Filed: Apr. 19, 2022

(65) Prior Publication Data

US 2022/0375334 A1 Nov. 24, 2022

Related U.S. Application Data

(60) Provisional application No. 63/192,173, filed on May 24, 2021.

(51) Int. Cl.
*G08C 23/04* (2006.01)
*G06F 3/16* (2006.01)
*G08C 17/02* (2006.01)

(52) U.S. Cl.
CPC ............ *G08C 23/04* (2013.01); *G06F 3/167* (2013.01); *G08C 17/02* (2013.01); *G08C 2201/20* (2013.01); *G08C 2201/50* (2013.01); *G08C 2201/92* (2013.01)

(58) Field of Classification Search
CPC .... G08C 23/04; G08C 17/02; G08C 2201/20; G08C 2201/50; G08C 2201/92; G08C 2201/21; G08C 17/00; G06F 3/167
See application file for complete search history.

(56) References Cited

U.S. PATENT DOCUMENTS

| | | | |
|---|---|---|---|
| 8,754,992 B1 * | 6/2014 | Schulze | H04N 21/42226 725/132 |
| 9,086,720 B1 * | 7/2015 | Garg | G06F 1/00 |
| 10,448,104 B1 | 10/2019 | Pontual et al. | |
| 2002/0171624 A1 * | 11/2002 | Stecyk | H04L 12/282 345/156 |

(Continued)

OTHER PUBLICATIONS

International Search Report and the Written Opinion of the International Searching Authority dated Jul. 15, 2022 in International (PCT) Application No. PCT/US2022/025299.

(Continued)

*Primary Examiner* — Adnan Aziz
(74) *Attorney, Agent, or Firm* — Wenderoth, Lind & Ponack, L.L.P.

(57) ABSTRACT

A control device is used to autonomously program a remote control device based on media device information received from a media device. The control device selects a program code set based on the media device information. The control device transmits a program code set to the remote control device and a test command. The test command causes the remote control device to transmit a program code from the program code set based on the test command. The control device monitors the media device and verifies that the program code associated with the test command controlled the associated function of the media device.

20 Claims, 4 Drawing Sheets

(56) References Cited

U.S. PATENT DOCUMENTS

| | | | | |
|---|---|---|---|---|
| 2006/0007015 A1* | 1/2006 | Krzyzanowski | ....... | G08C 17/02 |
| | | | | 341/176 |
| 2009/0040091 A1* | 2/2009 | Carlson | ................ | G08C 19/28 |
| | | | | 341/176 |
| 2011/0102158 A1* | 5/2011 | Haughawout | ......... | G08C 19/28 |
| | | | | 340/12.29 |
| 2011/0114716 A1* | 5/2011 | Pratt | ..................... | H04L 12/282 |
| | | | | 382/229 |
| 2012/0249890 A1* | 10/2012 | Chardon | ......... | H04N 21/43635 |
| | | | | 348/734 |
| 2014/0176313 A1* | 6/2014 | Richardson | ............ | G08C 17/00 |
| | | | | 340/12.29 |
| 2015/0131008 A1* | 5/2015 | Robinson | ............... | G08C 17/02 |
| | | | | 348/734 |
| 2015/0154858 A1 | 6/2015 | Arling et al. | | |
| 2018/0012485 A1 | 1/2018 | Park et al. | | |
| 2018/0077375 A1 | 3/2018 | Lee et al. | | |
| 2019/0020543 A1* | 1/2019 | Asnis | ................ | H04B 10/1143 |
| 2021/0120301 A1* | 4/2021 | Xu | ................... | H04N 21/42227 |
| 2021/0136359 A1* | 5/2021 | Marino | .................. | H04N 17/04 |
| 2021/0368562 A1* | 11/2021 | Hatambeiki | .......... | H04W 8/005 |

OTHER PUBLICATIONS

International Preliminary Report on Patentability dated Nov. 21, 2023 in International (PCT) Application No. PCT/US2022/025299.

* cited by examiner

AUDIO TONE ASSISTED RCU PROGRAMMING

BACKGROUND

Generally, user intervention is required for proper programming of a remote control device to operate properly so as to control one or more settings of an associated device, for example, a media device. After the remote control sends an infrared (IR) command to the associated device, a user must confirm or verify that the remote control device has been properly configured. For example, the user may be required to enter a response at the remote control unit, the associated device, or both. This can be a time consuming process and the user may become confused or have an unsatisfactory user experience based on the process whether or not the process is successful or not. Such a manual intervention is time consuming and can lead to a user incorrectly assuming that the remote control device, the media device or both are not functioning properly. Thus, there is a need for an autonomous process for programming a remote control device to control one or more functions of a media device.

SUMMARY

This disclosure relates generally to programming of a remote control device to control a media device, and in particular to using an audio tone to verify programming of a remote control device for controlling a media device.

An aspect of the present disclosure is drawn to a control device for configuring a remote control device associated with a media device, the control device comprising a memory and a processor. The processor is configured to execute one or more instructions stored on the memory to cause the control device to receive, from the media device, media device information associated with the media device, select a program code set based on the media device information, transmit the program code set to the remote control device, transmit a test command to the remote control device, wherein the test command is based on the program code set, monitor for an audio content from the media device based on the test command, and verify the program code set based on the monitoring.

In an aspect of the present disclosure, wherein the program code set comprises an infrared code set.

In an aspect of the present disclosure, such that the processor is further configured to execute the one or more instructions stored on the memory to additionally cause the control device to transmit the test command as a Bluetooth low energy signal.

In an aspect of the present disclosure, such that the processor is further configured to execute the one or more instructions stored on the memory to additionally cause the control device to detect the audio content from the media device, wherein the verification is based on the detection of the audio content.

In an aspect of the present disclosure, such that the processor is further configured to execute the one or more instructions stored on the memory to additionally cause the control device to select an additional program code set, transmit the additional program code set to the remote control device, transmit an additional test command to the remote control device, wherein the additional test command is based on the additional program code set, and verify the additional program code set based on monitoring of additional audio content from the media device.

In an aspect of the present disclosure, the media device information comprises an extended display identification data (EDID) or an enhanced-extended display identification data (E-EDID).

In an aspect of the present disclosure, such that the processor is further configured to execute the one or more instructions stored on the memory to additionally cause the control device to output a test audio content to the media device, detect an output from the media device, compare the output to the test audio content, and determine that the media device is suitable for configuration.

An aspect of the present disclosure is drawn to a method of using a control device to program a remote control device for operation with a media device. The method comprises receiving, from the media device, media device information associated with the media device, selecting a program code set based on the media device information, transmitting the program code set to the remote control device, transmitting a test command to the remote control device, wherein the test command is based on the program code set, monitoring for an audio content from the media device based on the test command, and verifying the program code set based on the monitoring.

In an aspect of the present disclosure, the method is such that the program code set comprises an infrared code set.

In an aspect of the present disclosure, the method further comprises transmitting the test command as a Bluetooth low energy signal.

In an aspect of the present disclosure, the method further comprises detecting the audio content from the media device, wherein the verification is based on the detection of the audio content.

In an aspect of the present disclosure, the method further comprises selecting an additional program code set, transmitting the additional program code set to the remote control device, transmitting an additional test command to the remote control device, wherein the additional test command is based on the additional program code set, and verifying the additional program code set based on monitoring of additional audio content from the media device.

In an aspect of the present disclosure, the method is such that the media device information comprises an extended display identification data (EDID) or an enhanced-extended display identification data (E-EDID).

In an aspect of the present disclosure, the method further comprises outputting a test audio content to the media device, detecting an output from the media device, comparing the output to the test audio content, and determining that the media device is suitable for configuration.

An aspect of the present disclosure provides a non-transitory computer-readable medium of a control device storing one or more computer-readable instructions for programming a remote control device. The one or more instructions when executed by a processor of the control device, cause the control device to perform one or more operations including the steps of the methods described herein.

The above-described novel solution may be implemented at a remote control programming environment that includes one or more devices, such as a control device, according to one or more example embodiments.

Thus, according to various aspects of the present disclosure described herein, it is possible to provide a control device for automating the process of programming of a remote control device. In particular, the novel solution provides improvements to programming a remote control device using one or more test commands and monitoring for audio output to verify the proper programming of the remote control device.

BRIEF SUMMARY OF THE DRAWINGS

The accompanying drawings, which are incorporated in and form a part of the specification, illustrate example embodiments and, together with the description, serve to explain the principles of the present disclosure. In the drawings.

DETAILED DESCRIPTION

All types of media devices are a ubiquitous part of today's households and offices. For example, a media device, such as a television, multi-media player, etc., can be connected to a control device, such as a set-top box (STB), so as to receive media content for playback at the media device. A remote control device is used to control the selection of media content at the media device as well as to control one or more functions and/or settings associated with the media device, such as any of a volume control, a channel selection, an input source selection, a trick-play control, any other setting and/or function associated with the media device, or any combination thereof.

According to one or more aspects of the present disclosure, an autonomous mechanism to confirm the programming of the remote control device with the appropriate IR key codes is provided so as to provide control of one or more settings associated with a media device within range of the remote control device. In general, a control device connected to the media player leverages the ability to output an audio test content directed to a media device for playback by the media device and control of audio content output by the media device based on a programmed IR transmission generated by a remote control device. The control device can automatically program the remote control device with the appropriate IR code set so as to eliminate any user intervention in the configuration of the remote control device. Eliminating user intervention or manual inputs provides for an accurate configuration of the remote control device, reduces setup time of the remote control device, and reduces complexity as the user is not required to ascertain the programming logic required for any particular remote control device. Such an autonomous process can also improve user satisfaction as user errors can be reduced or eliminated.

Figure 1:
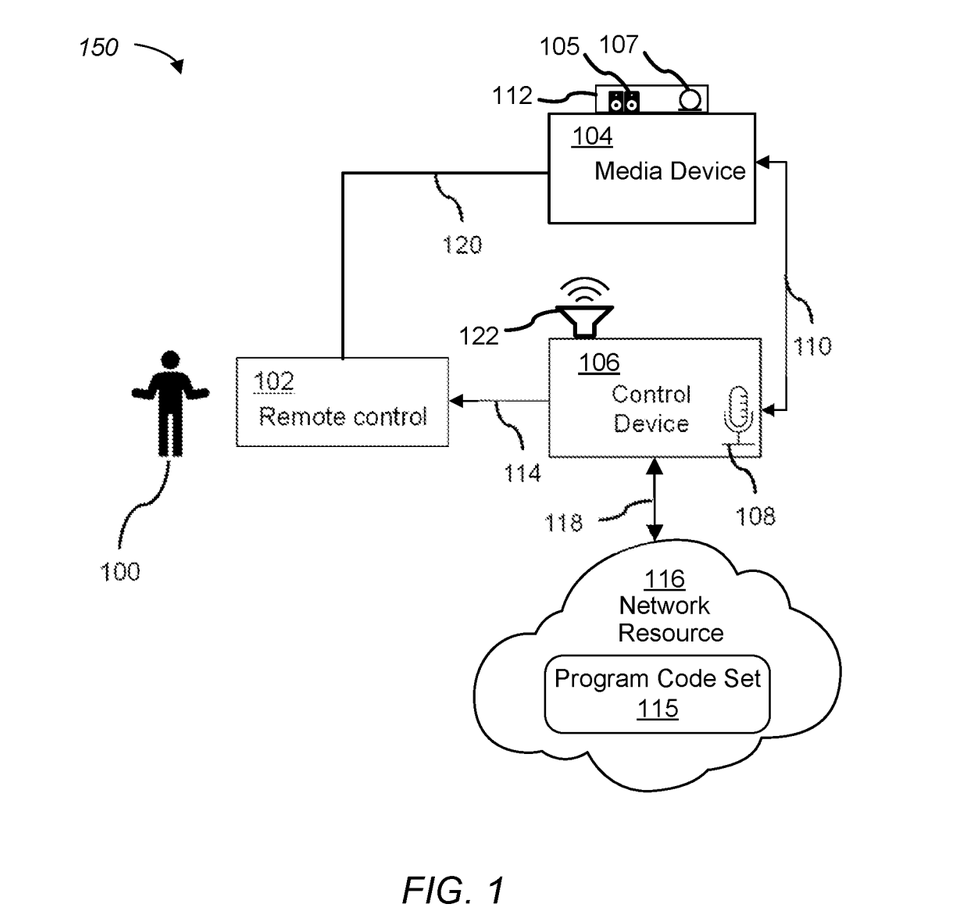
FIG. 1 illustrates a remote control device programming environment, according to one or more aspects of the present disclosure.

FIG. 1 illustrates a remote control device programming environment 150, according to one or more aspects of the present disclosure. A user 100 within the remote control device programming environment 150, for example, a home or office, can use a remote control device 102 to operate a media device 104. A media device 104 can comprise a television, an audio/video receiver (AVR), any type of multi-media playback device, or any combination thereof. The media device 104 can comprise an audio input/output (I/O) device 112. The audio I/O device 112 can comprise one or more audio elements, such as any of a sound bar that comprises an audio output device 105 (such as a speaker) and/or an audio receiver device 107 (such as a microphone), any other audio I/O device, or a combination thereof. The audio I/O device 112 can be included within and/or coupled to the media device 104. In one or more embodiments, any one or more audio elements of the audio I/O device 112 can be distinct components, for example, the audio I/O device 112 can comprise an audio output device 105 and an audio input device 107 as distinct components.

A connection 110 connects control device 106 to the media device 104. For example, the connection 110 can comprise a high-definition multimedia interface (HDMI) connection. Control device 106 can comprise any of a set-top box, a cable modem, any other type of device for receiving and/or directing media content, or any combination thereof. The control device 106 can comprise an audio output device 122, for example, a speaker, an audio receiver device 108, for example, a microphone, or both. The audio receiver device 108 can receive audio content output from the audio I/O device 112, for example, audio output device 105, and use that received audio content to verify configuration of the remote control device 102, for example, audio content associated with a test audio content from the control device 106. The control device 106 can be communicatively coupled to the remote control device 102 via a wireless connection 114 and to a network resource 116 via a connection 118.

The network resource 116 can be any of a database, a uniform resource locator (URL), a webpage, any cloud-based storage, a server, any other type of repository, or any combination thereof. The network resource 116 can store or provide access to one or more program code sets 115 that comprise one or more program codes, for example, one or more IR code sets that comprise one or more IR codes, for one or more types of media devices 104. The control device 106 can request one or more program code sets 115 from the network resource 116 based on information received from the media device 104. For example, the control device 106 can receive one or more program code sets 115, such as one or more IR code sets, remotely from the network resource 116 and/or can have the one or more program code sets 115 stored locally at the control device 106. The one or more program code sets 115 can include one or more program code sets associated with one or more media devices 104. In one or more embodiments, a plurality of program code sets 115 can be associated with a media device 104.

The remote control device 102 can be communicatively coupled to the media device 104 by way of a wireless connection 120. For example, the wireless connection 120 can comprise an IR control signal for controlling, altering, and/or changing one or more functions associated with the media device 104. In one or more embodiments, the remote control device 102 is within or part of the control device 102 such that the wireless connection 120 is not needed and/or is an internal connection such as a bus or other pathway.

Many times a user 100 has an unsatisfactory experience with configuring a remote control device 102 for operation with a media device 104. For example, a user 100 may be required to ascertain the manufacturer and model number information of media device 104 so that remote control device 102 can be properly programmed to transmit the correct program code set 115 over a wireless connection 120 to the media device 104. This process is often complex, cumbersome, and time-consuming especially given that a remote control device 102 is often designed with many buttons arranged in dense layouts, which are difficult to understand and manipulate for certain population segments. Thus, the autonomous programming of the remote control device 102 by a control device 106 provides not only for improved user satisfaction but also reduces costs associated with user errors in the programming of the remote control device 102.

Figure 2:
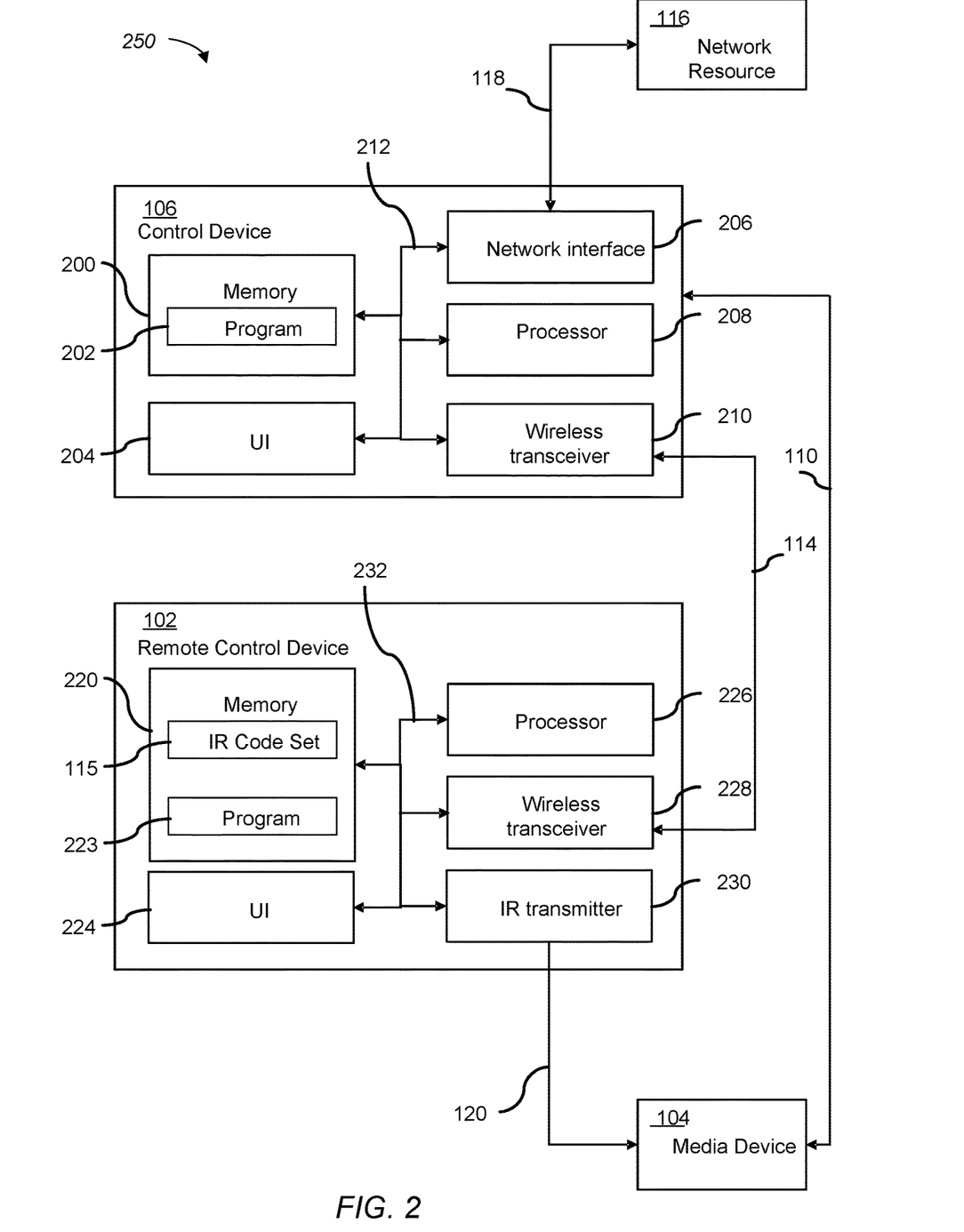
FIG. 2 illustrates a remote control device programming system, according to one or more aspects of the present disclosure.

FIG. 2 illustrates a remote control device programming system 250, according to one or more aspects of the present disclosure. For example, the remote control device programming system 250 provides more detail of one or more components of the remote control device programming environment 150. The remote control device programming system 250 comprises a remote control device 102, a media device 104, a control device 106, and a network resource 116. A connection 110 connects media device 104 and control device 106. Wireless connection 114 connects control device 106 and remote control device 102 and a wireless connection 120 connects remote control device 102 and media device 104. In one or more embodiments, wireless connection 114 comprises a Bluetooth low energy (BLE) signal and wireless connection 120 comprise an IR signal. The control device 106 can communicate to network resource 116 via connection 118.

In one or more embodiments, control device 106 may be any device or system that is configured to perform a function and/or communicate with network resource 116, media device 104, and remote control device 102. In one or more embodiments, remote control device 102 may be any device or system that is configured to communicate with media device 104 over wireless connection 120 and receive one or more program code sets 115 from control device 106 over the wireless connection 114. The remote control device 102 can be a stand-alone remote control device or unit (RCU) associated with any one or more consumer electronic devices, such as any of a television, a video playback device, a video recorder, a DVD player, a Blu-ray player, a video streaming players, a STB, a sound bar, a wireless speaker, a smart media device, a gaming console, or any combination thereof. In one or more embodiments, the remote control device 102 can be a universal remote.

Network resource 116 can be any device or system that is configured to store, process, and communicate information. While network resource 116 is depicted as a single device external to the control device 106, the present disclosure contemplates that the network resource 116 can comprise a plurality of devices disposed at or about one or more locations.

Connection 118 may be any type of communication channel that facilitates communications between devices or networks, such as network resource 116 and a network interface 206 of a control device 106. Connection 118 may comprise physical media or wiring, such as coaxial cable, optical fiber, or digital subscriber line (DSL), wireless links, such as wireless fidelity (Wi-Fi), long term evolution (LTE), satellite, terrestrial radio links, or a combination of any of these examples or their equivalents. The term "Wi-Fi" as used herein may be considered to refer to any of Wi-Fi 4, 5, 6, 6E networks, or any variation thereof. The data communicated over connection 118 can be implemented using a variety of protocols on a network such as a wide-area network (WAN), a virtual private network (VPN), a metropolitan area network (MAN), a system area network (SAN), a data over cable service interface specification (DOCSIS) network, a fiber optics network (including fiber-to-the-home, fiber-to-the-X, or hybrid fiber-coax), a digital subscriber line (DSL), a public switched data network (PSDN), a global Telex network, or a 2G, 3G, 4G, 5G, 6G or 60G, for example. Though connection 118 is shown as a single link, the present disclosure contemplates that connection 118 can comprise multiple links and devices, including access points, routers, gateways, and servers.

Wireless connection 114 may be any type of wireless signal, such as any of an IR signal, a Bluetooth (BT) signal, a BLE signal, an RF4CE signal, any other wireless signal associated with any type of wireless connection, or a combination thereof, that facilitates communications between a control device 106 and a remote control device 102.

The wireless connection 120 can comprise an IR signal, for example, that enables remote control device 102 to select, change and/or alter one or more functions of a media device 104 when the remote control device 102 is within a communication range of the media device 104. For example, an IR signal can be a low data-rate signal where one or more program code sets 115 for the media device 104 are modulated onto an infrared waveform, with, for example, carrier frequencies typically around 30-60 Kilohertz (kHz). The one or more functions can comprise any of a volume control, a channel selection, a source input selection, a trick-play control, any other setting, operation, and/or function associated with the media device 104, or any combination thereof.

Connection 110 may be analog or digital, uni- or bi-directional, and are typically based on standards used by consumer electronics devices. Non-limiting examples of connection 110 include HDMI, digital visual interface (DVI), DisplayPort, universal serial bus (USB), component video, S-Video, composite video, optical audio such as Toshiba link (TOSLINK), and analog audio.

Control device 106 comprises a memory 200, a user interface (UI) 204, a network interface 206, a processor 208, and a wireless transceiver 210. Memory 200, UI 204, network interface 206, processor 208, and wireless transceiver 210 are connected by bus 212. While memory 200, UI 204, network interface 306, processor 308, and wireless transceiver 210 are illustrated as individual devices, the present disclosure contemplates that any of memory 200, UI 204, network interface 206, processor 208, wireless transceiver 210, or any combination thereof can be combined as a unitary device. The control device 106 can be a computer with memory 200 comprising a non-transitory computer-readable medium for carrying or having one or more computer-executable instructions or data structures stored thereon. Such non-transitory computer-readable medium refers to any computer program product, apparatus or device, such as a magnetic disk, optical disk, solid-state storage device, memory, programmable logic devices (PLDs), dynamic random access memory (DRAM), random access memory (RAM), read-only memory (ROM), erasable programmable read-only memory (EPROM), electrically erasable programmable read-only memory (EEPROM), compact disc read-only memory (CD-ROM) or other optical disk storage, magnetic disk storage or other magnetic storage devices, or any other medium that can be used to carry or store a computer-readable program code in the form of one or more instructions or data structures and that can be accessed by a general-purpose or special-purpose computer or a general-purpose or special-purpose processor. Disk or disc, as used herein, includes compact disc (CD), laser disc, optical disc, digital versatile disc (DVD), floppy disk and Blu-ray disc. Combinations of the above are also included within the scope of computer-readable medium. For information transferred or provided over a network or another communications connection (either hardwired, wireless, or a combination of hardwired or wireless) to a computer, the computer may properly view the connection as a computer-readable medium. Thus, any such connection may be properly termed a computer-readable medium. Combinations of the above should also be included within the scope of computer-readable medium.

In one or more embodiments, a non-transitory tangible computer-readable medium such as memory 200 may be coupled to a processor, such as processor 208, such that the processor may read information from, and write information to, the non-transitory tangible computer-readable medium. In one or more embodiments, a memory 200 or any other tangible computer-readable medium may be integral to processor 208. A processor 208 and the tangible computer-readable medium or memory 200 may reside in an integrated circuit (IC), an ASIC, or large scale integrated circuit (LSI), system LSI, super LSI, or ultra LSI components that perform a part or all of the functions described herein. In one or more embodiments, a processor 208 and a memory 200 can be discrete components.

In one or more embodiments, a tangible computer-readable medium can be coupled to one or more systems, such as a computer system/server, which is operational with numerous other general-purpose or special-purpose computing system environments or configurations. Examples of well-known computing systems, environments, and/or configurations that may be suitable for use with computer system/server include, but are not limited to, personal computer systems, server computer systems, thin clients, thick clients, handheld or laptop devices, multiprocessor systems, microprocessor-based systems, set-top boxes, programmable consumer electronics, network PCs, minicomputer systems, mainframe computer systems, and distributed cloud computing environments that include any of the above systems or devices, and the like.

Such a computer system/server may be described in the general context of computer system-executable instructions, such as program modules, being executed by a computer system. Generally, program modules may include routines, programs, objects, components, logic, data structures, and so on that perform particular tasks or implement particular abstract data types. Further, such a computer system/server may be practiced in distributed cloud computing environments where tasks are performed by remote processing devices that are linked through a communications network. In a distributed cloud computing environment, program modules may be located in both local and remote computer system storage media including memory storage devices.

Processor 208 is configured to execute a program 202 stored in a memory 200. A program 202 can include one or more instructions, that when executed by a processor 208, cause control device 106 to perform one or more operations of any one or more methods discussed herein; generate wireless signal 114 as a wireless instruction signal based on the primary device data; and transmit the wireless instruction signal to cause remote control device 106 to transmit a program code of a program code set via the wireless connection 114 to instruct the media device 104 to perform a function or to cause an IR signal, for example, to be transmitted via a connection 110 to instruct the media device 104 to perform a function. In or more embodiments, the program 202 includes additional instructions, that when executed by the processor 208, cause control device 106 and/or remote control device 102 to transmit a wireless instruction signal.

Network interface 206 may be any device or system that is configured to establish and maintain a connection 118. Network interface 206 may include one or more antennas and communicate wirelessly via one or more of the 2.4 GHz band, the 5 GHz band, the 6 GHz band, and the 60 GHz band, or at the appropriate band and bandwidth to implement any IEEE 802.11 Wi-Fi protocols, such as the Wi-Fi 4, 5, 6, or 6E protocols.

Remote control device 102 contains a memory 220, a UI 224, a processor 226, a wireless transceiver 228, and an IR transmitter 230. Memory 220, UI 224, processor 226, wireless transceiver 228, and IR transmitter 230 are connected by bus 232. Memory 220 includes a program code set 115 and a program 223 stored therein.

While memory 220, UI 224, processor 226, wireless transceiver 228, and IR transmitter 230 are illustrated as individual devices, the present disclosure contemplates that any of memory 220, UI 224, processor 226, wireless transceiver 228, IR transmitter 230, or any combination thereof can be combined as a unitary device. In one or more embodiments, at least one of memory 220, UI 224, processor 226, wireless transceiver 228, and IR transmitter 230 can be a computer with memory 220 comprising a non-transitory computer-readable medium for carrying or having one or more computer-executable instructions or data structures stored thereon similar to or the same as discussed above with respect to memory 200. Processor 226 is configured to execute a program 223 stored in a memory 220.

Processors 208 and 226 may each be any device or system that is configured to control general operations of control device 106 and remote control device 102, respectively, and include, but are not limited to, central processing units (CPUs), hardware microprocessors, single-core processors, multi-core processors, field-programmable gate arrays (FPGAs), microcontrollers, application-specific integrated circuits (ASICs), digital signal processors (DSPs), or other similar processing devices capable of executing any type of instructions, algorithms, or software for controlling the operations and functions of media device 104 and/or remote control device 102.

Memory 220 may be any device or system configured to store data and instructions used by control device 106 and remote control device 102 respectively, and include, but are not limited to, RAM, DRAM, hard drives, solid-state drives, ROM, EPROM, EEPROM, flash memory, embedded memory blocks in field programmable gate arrays (FPGAs), or any other various layers of memory hierarchy.

Wireless transceivers 210 and 228 may each be any device or system that is configured to establish and maintain wireless connection 114. In this non-limiting example, wireless transceivers 210 and 228 are radio transceivers or wireless communication circuits that implement wireless connections in accordance with any IR or Bluetooth protocols, Bluetooth Low Energy (BLE), or other short-range protocols that operate in accordance with a wireless technology standard for exchanging data over short distances using any licensed or unlicensed band such as the CBRS band, 2.4 GHz bands, 5 GHz bands, 6 GHz bands, or 60 GHz bands, RF4CE protocol, ZigBee protocol, Z-Wave protocol, or IEEE 802.15.4 protocol.

It should be noted that in accordance with aspects of the present disclosure, wireless transceivers 210 and 228 can wirelessly communicate in a manner different from IR transmitter 230. In one or more embodiments, wireless transceivers 210 and 228 wirelessly communicate in a protocol that is different from that as used by IR transmitter 230, for example, a frequency band that is different from that as used by IR transmitter 230.

UIs 204 and 224 may each be any device or configured to present information and accept user inputs on control device 106 and remote control device 102 respectively, and include, but are not limited to, liquid crystal displays (LCDs), thin film transistor (TFT) displays, light-emitting diodes (LEDs), touch screens, buttons, microphones, and speakers.

IR transmitter 230 may be any device or system that is configured to create and modulate infrared waveforms that can be used to control media device 104. In one or more embodiments, IR transmitter 230 can be an LED system that comprises an LED and one or more associated circuits.

Bus 212 may be any device or system that is configured to provide data communications between memory 200, UI 204, network interface 206, processor 208, and wireless transceiver 210 of control device 106. Bus 232 may be any device or system that is configured to provide data communications between memory 220, UI 224, processor 226, wireless transceiver 228, and IR transmitter 230 of remote control device 102. Buses 212 and 232 may be one or more of any of several types of bus structures, including a memory bus or a memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

Program 202 comprises one or more computer-readable instructions that when executed by a processor 208 of control device 106 cause the control device 106 to perform one or more operations, including communicating with network resource 116 and remote control device 102, processing user inputs, and generating instructions and/or commands. Program 202, having at least one program module, can be stored in memory 200 and by way of example, and not limitation, can comprise as well as an operating system, one or more application programs, other program modules, and program data. Similarly, program 223 comprises one or more computer-readable instructions that when executed by a processor 226 of remote control device 102 cause the remote control device 102 to perform one or more operations. The program 223, having at least one program module, can be stored in memory 220 and by way of example, and not limitation, can comprise an operating system, one or more application programs, other program modules, and program data. Each of the operating systems, one or more application programs, other program modules, and program data or some combination thereof, may include an implementation of a networking environment. The program modules generally carry out the functions and/or methodologies of various embodiments of the disclosure as described herein.

A program code set 115 is a non-limiting example of a data structure that comprises one or more program codes associated with media device 104, for example, one or more IR codes. The one or more program code sets 115, can control one or more functions of the media device 104 including, but not limited to, a toggle power function, a volume control function, an input source selection, any other function associated with the media device 104, and any combination thereof. The remote control device 102 can be configured with an program code set 115 by the control device 106. The control device 106 can store one or more program code sets 115 for each of a plurality of media devices 104 in a memory 200 and/or any one or more program code sets 115 for a specific media device 104 can be retrieved from a network resource 116.

For purposes of discussion and referring to FIG. 2, suppose that user 100 is using remote control device 102 in combination with media device 104 for the first time within a remote control device programming system 250. For example, a remote control device programming system 250 can comprise any of remote control device 102 that is a legacy RCU or a newly acquired RCU, a media device 104 that is previously installed or newly installed, or any combination thereof. In any situation, user 100 is using a remote control device 102 requires configuration or programming to operate with a media device 104. The control device 106 obtains information from the media device 104 so as to configure and/or program the remote control device 102 with one or more program code sets 115 so that the remote control device 102 can control one or more functions of the media device 104.

While one or more aspects of the present disclosure discuss the remote control device 102 external to or otherwise as a distinct component from the control device 106, the present disclosure contemplates that the remote control device 102 can be an integral component of the control device 106, for example, such that the remote control device 102 is within or part of the control device 106.

Figure 3:
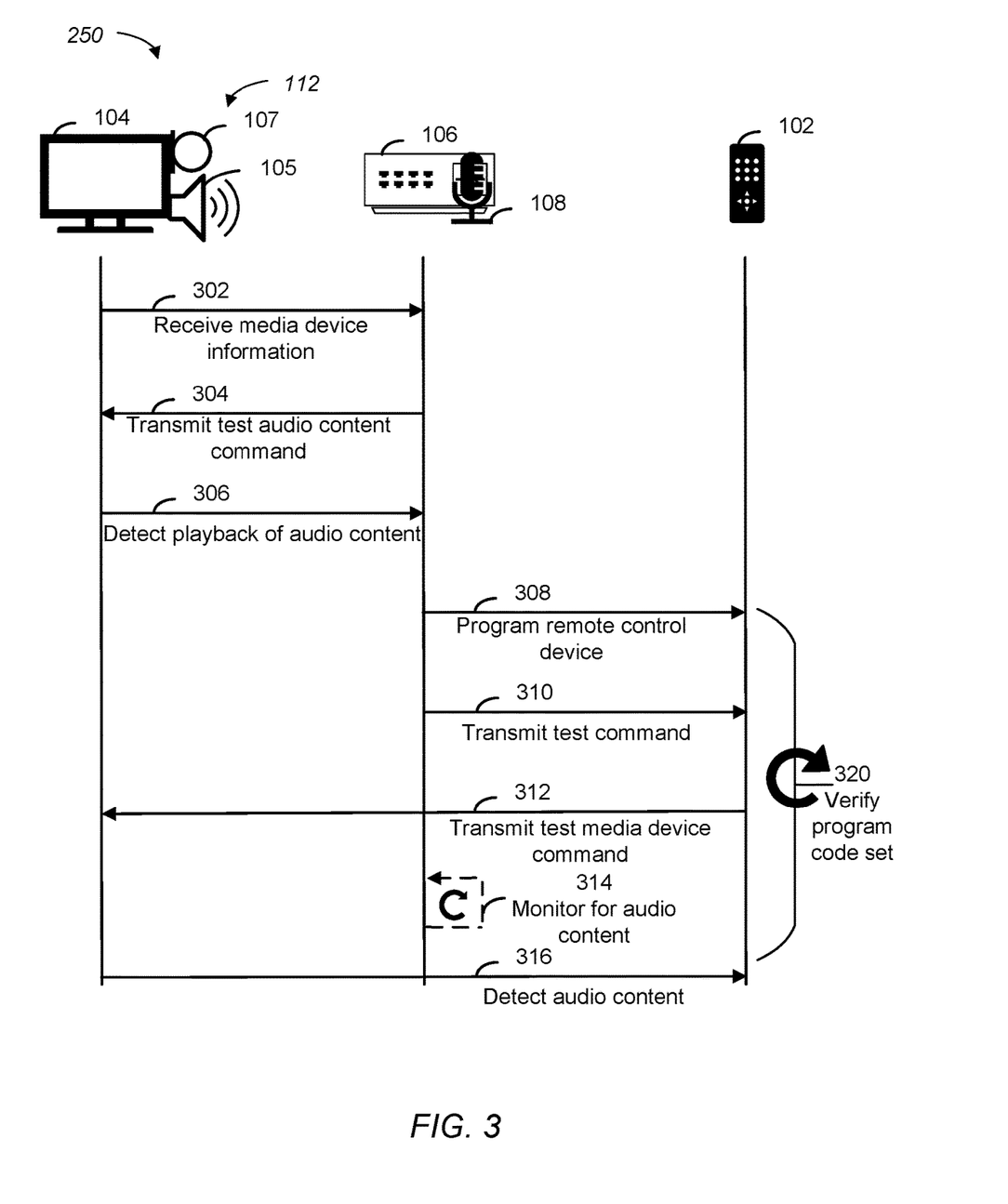
FIG. 3 illustrates a method of programming a remote control device using a control device, according to one or more aspects of the present disclosure.

FIG. 3 illustrates a method of autonomously programming a remote control device 102 using a control device 106, according to one or more aspects of the present disclosure, for example, a remote control device programming system 250. The control device 106 receives media device information 302 from the media device 104 that includes one or more device identifiers associated with the media device 104. The one or more device identifiers can comprise any of a make, a model, a date of manufacturer, any one or more other device identifiers (such as any of an extended display identification data (EDID), an enhanced-extended display identification data (E-EDID), any other type of data, or a combination thereof), and a combination thereof. For example, after connection of the control device 106 to the media device 104, the media device 104 can transmit the media device information 302, including the one or more device identifiers, to the control device 106 via connection 110. The control device 106 can receive the media device information 302 via connection 110 and store the media device information 302 (including the one or more device identifiers) in a memory 200. In one or more embodiments, the connection 110 is an HDMI connection with HDMI source defining the protocol for the control device 106 to read and/or receive the media device information 302 from the media device 104. In one or more embodiments, the media device information 302 may not accurately reflect the operation of the media device 104 as there can be ambiguity in a program code set 115 required to control one or more functions of the media device 104 which can require user intervention. One or more aspects of the present disclosure overcome this requirement of user intervention by providing an autonomous selection of a program code set 115 using a verification process.

The control device 106 can transmit or output a test audio content 304 to the media device 104 via the connection 110. For example, the control device 106 can send a test audio content command 304 via the connection 110. The test audio content command 304 includes one or more instructions that cause the media device 104 to output or playback an audio content 306. The control device 106 can detect an output or playback of the audio content 306 from the media device 104 via an audio content receiver 108. The test audio content command 304 can comprise an audio file or an audio tone that includes a particular audio tone (such as a fixed frequency tone) or sequence of audio tones (such as a pseudo random binary sequency) that is unique to any of the media device 104, the control device 106 in association with the media device 104, any other element and/or component associated with the media device 104 and/or the control device 106, and a combination thereof.

The control device 106 can perform a verification 320 of the media device information 302 received from the media device 104. For example, this verification 320 ensures that the proper program code set 115 (such as an operational IR code set) has been selected for use by the remote control device 102 to control one or more functions of the media device 104. As part of the verification 320, the control device 106 programs 308 the remote control device 102, for example, by transmitting a selected program code set 115 to the remote control device 102. For example, the control device 106 can retrieve a program code set 115, such as an IR code set, from a memory 200, a network resource 116, or both based on the media device information 302, such as the EDID or E-EDID information. The control device 106 can program the remote control device 102 by transmitting the program code set 115 to the remote control device 102, for example, via a wireless connection 114. The remote control device 102 can receive the program code set 115 and store the program code set 115 in a memory 220.

The control device 106 can transmit a test command 310 to the remote control device 102. The test command 310 can comprise an instruction to execute one or more program codes of the program code set 115. For example, the control device 106 can send a test command 310 to the remote control device 102 to cause the remote control device 102 to transmit a test media device command 312 to the media device 104. The test media device command 312 can comprise a volume control instruction, such as an IR code associated with controlling volume of the media device 104. In one or more embodiments, the media device 104 is connected to a power source and is turned on such that media content including at least audio content is distributed or being played back by the media device 104 such that the audio receiver device 108 can receive the audio content being played back by the media device 104. The test media device command 312 transmitted from the remote control device 102 to the media device 104 based on the test command 310 can comprise a mute volume instruction such that if the test command 310 is recognized by the media device 104, the volume associated with the audio being played back at the media device 104 is altered or changed to be muted such that the audio content receiver 108 does not detect any audio content 316 from the media device 104. For example, the control device 106 monitors for audio content 314 being played back by the media device 104 and detects the audio content 316, for example, by an audio receiver device 108. If the control device 106 detects any audio content (indicative of a failure of the test media device command 312), the control device 106 will repeat the verification 320 such that another program code set 115, if available, is selected or retrieved and transmitted to the remote control device 102 so as to configure the remote control device 102 to control one or more functions of the media device 104. In one or more embodiments, the test command 310 causes the remote control device 102 to transmit a test media device command 312 that comprises one or more instructions to toggle the volume of the audio content being played back at the media device 104, for example, to perform a mute and unmute (or vice versa) the volume associated with the audio content being played back sequence. In one or more embodiments, the volume control instruction causes the media device 104 to mute the playback of the audio content 306 originally detected by the control device 106 such that the control device 104 no longer detects the playback of the audio content of 316. In this way, the control device 106 can verify that the program code set 115 transmitted to the remote control device 102 will control one or more functions associated with the media device 104.

The verification 320 can continue until any of the one or more media device programming codes has been verified through a test media device command 312 and associated detection of the audio content 316, a verification threshold (for example, the verification threshold can be a length of time for the verification 320 to be completed) has been reached, exceeded, or both, a programming code set threshold (for example, a number of different program code sets that can be utilized to program the remote control device 102) has been reached, exceeded, or both, any other threshold, or a combination thereof.

Figure 4:
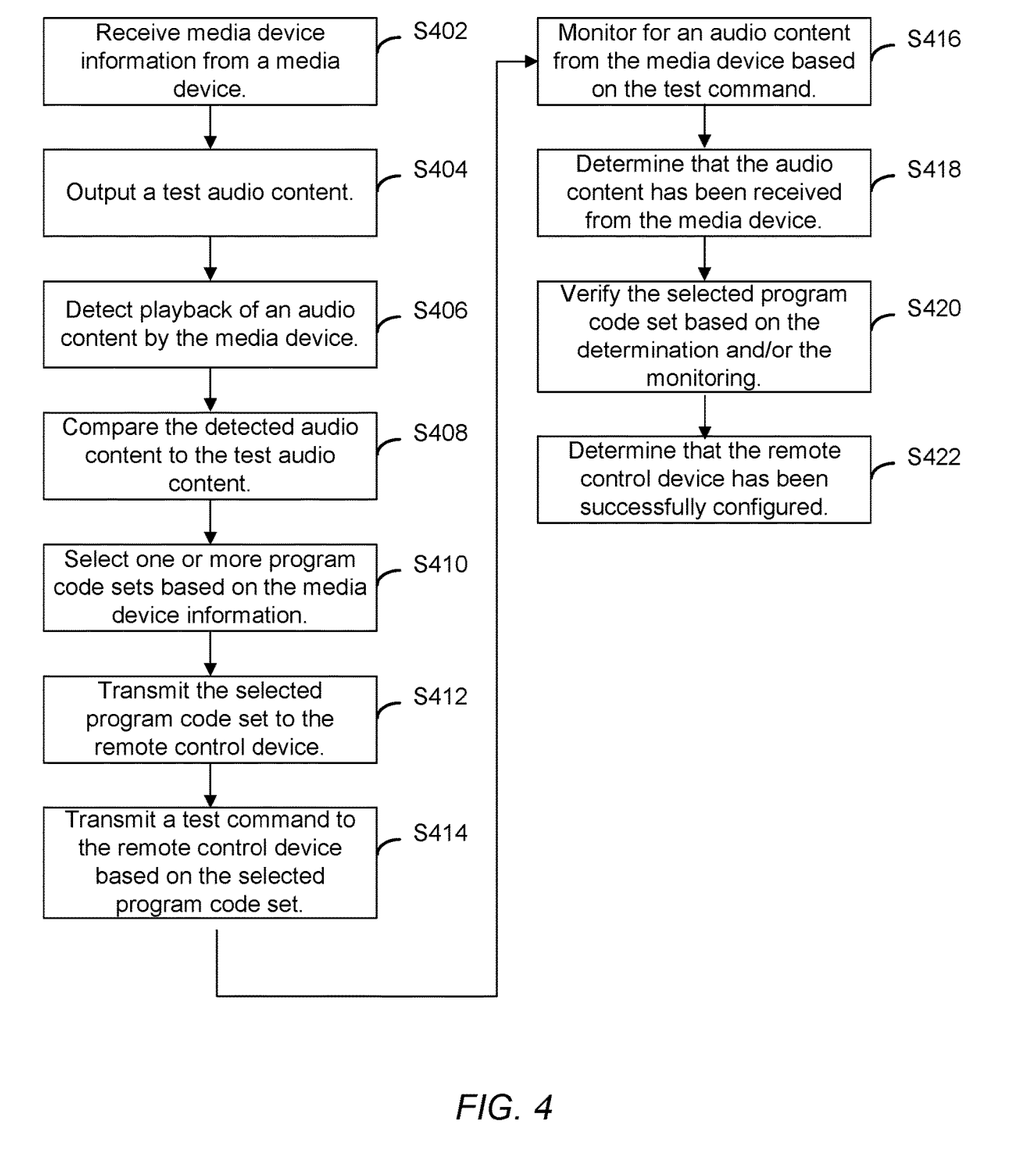
FIG. 4 is a flow chart illustrating a method for a control device to program a remote control device for operation with a media device, according to one or more aspects of the present disclosure.

FIG. 4 is a flow chart illustrating a method of a control device 106 to program a remote control device 102 to control operation of a media device 104, according to one or more aspects of the present disclosure. For example, the remote control device 102 when properly programmed can be used to control one or more functions of a media device 104. The control device 106 can be programmed with one or more computer-readable instructions such as a software or program 202 that when executed by a processor or controller 208 cause the control device 106 to program a remote control device 102 for operation with a media device 104. In FIG. 4, it is assumed that any one or more of the control device 106, the media device 104, and/or the remote control device 102 include their respective controllers and their respective software stored in their respective memories, as discussed above in connection with FIGS. 1-3, which when executed by their respective controllers perform the functions and operations in accordance with the example embodiments of the present disclosure (for example, including programming a remote control device 102). While the steps S410-S422 are presented in a certain order, the present disclosure contemplates that any one or more steps can be performed simultaneously, substantially simultaneously, repeatedly, in any order or not at all (omitted).

A control device 106 can be disposed within proximity of a media device 104 such that the control device 106 is connected to the media device 104 so as to provide media content (such as multi-media content including, but not limited to, programming received from a cable operator and/or service provider) to the media device 104. For example, the control device 106 can be connected to the media device 104 via an HDMI connection. A remote control device 102 can be disposed within proximity of the media device 104 such that the media device 104 can receive one or more wireless signals from the remote control device 102. The remote control device 102 can be disposed within or as part of the control device 106 or disposed within proximity of the control device 106 so that the control device 106 can transmit one or more wireless signals to the remote control device 102.

At step S402, the control device 106 can receive from the media device 104 media device information associated with the media device 104 via the connection 110, for example, an HDMI connection. The media device information can be stored by the control device 106 locally in a memory 200, remotely at a network resource 116, or both. The media device information can include one or more media device identifiers that provide information about the media device 104. At step S404, the control device 106 can output a test audio content based on the media device information. At step S406, the control device 106 detects an output from the media device 104, for example, that the media device 104 is playing back an audio content. At step S408, the control device 106 compares the detected audio content, the output from the media device 104, to the test audio content. The control device 106 can determine that the control device 106 and the media device 104 are in communication with each other such that the media device can be controlled by a properly programmed remote control device 102.

At step S410, the control device 106 can select one or more program code sets 115, for example, one or more IR code sets, for programming the remote control device 102 based on the media device information. At step S412, control device 106 transmits the selected program code set 115 to the remote control device 102 such that the remote control device 102 can control one or more functions of the media device 104 based on the selected program code set 115. For example, the remote control device 102 can transmit one or more program codes of the selected program code set 115 to the media device 104 to control a particular function or one or more functions of the media device 104.

At step S414, the control device 106 transmits a test command to the remote control device 102 based on the selected program code set 115. The test command can comprise one or more program codes of the selected program code set 115, a program code identifier associated with the one or more program codes, or both. For example, the control device 106 can transmit a sequence of test commands to cause the remote control device 102 to cycle between muting and unmuting the volume control, toggling power, perform any other function, or any combination thereof of the media device 104, for example, until a threshold associated with the test command has been reached.

At step S416, the control device 106 can monitor for an audio content from the media device 104. For example, the control device 106 can monitor an audio receiver device 108 associated with the control device 106, for example, an audio receiver device 108 within or connected to the control device 106, for audio content from the media device 104 responsive to a test media device command from the remote control device 102 that is based on the test command. At step 418, the control device 106 determines that audio content has been received from the media device 104. At step S420, the control device 106 verifies the selected program code set based on the monitoring at step 416, the determination at step S418, or both. For example, the control device 106 can compare the audio content to previous audio content including, but not limited to, any of a volume level the audio content and/or the previous audio content, a presence and/or lack of presence of the audio content and/or the previous audio content, any other parameter associated with playback of media content (for example, audio content) by the media device 104, or any combination thereof.

In one or more embodiments, the media device determines that the selected program code set is not properly controlling the media device 104 based on the monitoring for audio content or the detection of the audio content. The media device 104 can select an additional program code set based on the media device information and perform any one or more of the previous steps. For example, the media device 104 can transmit the additional program code set to the remote control device 102 so as to program the remote control device 102, transmit an additional test command to the remote control device 102 based on the selected additional program code set, and verify the selected additional program code set based, for example, on a monitoring of additional audio content from the media device 104.

At step S422, the control device 106 can indicate that the remote control device 102 has been successfully configured to control one or more functions associated with the media device 104. For example, the control device 106 can any of illuminate one or more indicators disposed on a surface of the control device 106 (for example, one or more indicators associated with UI 204, UI 224, or both), emit an audio content tone or sequence of tones, cause one or more indications at the remote control device 102 to be triggered, any other indication, or any combination thereof.

Televisions are a common consumer electronic device in many households and offices, and each TV is often attached to other consumer electronics devices such as STBs, video disc players, video streaming players, smart speakers, and gaming consoles. Many consumer electronic devices are accompanied by their own remote control devices, resulting in a scenario where multiple remote control devices must be operated in order to accomplish a user intention. Several existing products, such as universal remotes and IR blasters, attempt to simplify this problem. However, universal remotes and IR blasters can themselves be complex to set up and use. In accordance with the present disclosure, a control device is used with a remote control device to control one or more functions of a media device. The remote control device is programmed autonomously using a program code set transmitted by the control device. The program control set is verified by the remote control device to ensure that the program control set will control the one or more functions of the media device.

The foregoing description of various preferred embodiments have been presented for purposes of illustration and description. It is not intended to be exhaustive or to limit the present disclosure to the precise forms disclosed, and obviously many modifications and variations are possible in light of the above teaching. The example embodiments, as described above, were chosen and described in order to best explain the principles of the present disclosure and its practical application to thereby enable others skilled in the art to best utilize the present disclosure in various embodiments and with various modifications as are suited to the particular use contemplated. It is intended that the scope of the present disclosure be defined by the claims appended hereto.

What is claimed is:

1. A control device to configure a remote control device associated with a media device, the control device comprising:

a memory; and a processor configured to execute one or more instructions stored on the memory to cause the control device to:

receive, from the media device, media device information associated with the media device, wherein the control device is connected to the media device so as to provide media content to the media device;

select a program code set based on the media device information;

transmit the program code set to the remote control device;

transmit a test command to the remote control device, wherein the test command comprises an instruction for the remote control device to execute one or more program codes of the program code set so as to cause the remote control device to transmit a test media device command to the media device based on the test command;
monitor for an audio content from the media device responsive to the test media device command; and
verify the program code set based on the monitoring.

2. The control device of claim 1, wherein the program code set comprises an infrared code set.

3. The control device of claim 1, wherein the processor is further configured to execute the one or more instructions stored on the memory to additionally cause the control device to transmit the test command as a Bluetooth low energy signal.

4. The control device of claim 1, wherein the processor is further configured to execute the one or more instructions stored on the memory to additionally cause the control device to detect the audio content from the media device, wherein the verification is based on the detection of the audio content.

5. The control device of claim 1, wherein the processor is further configured to execute the one or more instructions stored on the memory to additionally cause the control device to:
select an additional program code set;
transmit the additional program code set to the remote control device;
transmit an additional test command to the remote control device, wherein the additional test command is based on the additional program code set; and
verify the additional program code set based on monitoring of additional audio content from the media device.

6. The control device of claim 1, wherein the media device information comprises an extended display identification data (EDID) or an enhanced-extended display identification data (E-EDID).

7. The control device of claim 1, wherein the processor is further configured to execute the one or more instructions stored on the memory to additionally cause the control device to:
output a test audio content to the media device;
detect an output from the media device;
compare the output to the test audio content; and
determine that the media device is in communication with the control device based on the comparison.

8. A method of a control device to program a remote control device for operation with a media device, the method comprising:
receiving, from the media device, media device information associated with the media device, wherein the control device is connected to the media device so as to provide media content to the media device;
selecting a program code set based on the media device information;
transmitting the program code set to the remote control device;
transmitting a test command to the remote control device, wherein the test comprises an instruction for the remote control device to execute one or more program codes of the program code set so as to cause the remote control device to transmit a test media device command to the media device based on the test command;
monitoring for an audio content from the media device responsive to the test media device command; and
verifying the program code set based on the monitoring.

9. The method of claim 8, wherein the program code set comprises an infrared code set.

10. The method of claim 8, further comprising:
transmitting the test command as a Bluetooth low energy signal.

11. The method of claim 8, further comprising:
detecting the audio content from the media device, wherein the verification is based on the detection of the audio content.

12. The method of claim 8, further comprising:
selecting an additional program code set;
transmitting the additional program code set to the remote control device;
transmitting an additional test command to the remote control device, wherein the additional test command is based on the additional program code set; and
verifying the additional program code set based on monitoring of additional audio content from the media device.

13. The method of claim 8, wherein the media device information comprises an extended display identification data (EDID) or an enhanced-extended display identification data (E-EDID).

14. The method of claim 8, further comprising:
outputting a test audio content to the media device;
detecting an output from the media device;
comparing the output to the test audio content; and
determining that the media device is in communication with the control device based on the comparison.

15. A non-transitory, computer-readable medium of a control device having one or more computer-readable instructions stored thereon, that when executed by a processor cause the control device to perform one or more operations comprising:
receiving, from the media device, media device information associated with the media device, wherein the control device is connected to the media device so as to provide media content to the media device;
selecting a program code set based on the media device information;
transmitting the program code set to the remote control device;
transmitting a test command to the remote control device, wherein the test command comprises an instruction for the remote control device to execute one or more program codes of the program code set so as to cause the remote control device to transmit a test media device command to the media device based on the test command;
monitoring for an audio content from the media device responsive to the test media device command; and
verifying the program code set based on the monitoring.

16. The non-transitory, computer-readable medium of claim 15, wherein at least one of the program code set comprises an infrared code set and the media device information comprises an extended display identification data (EDID) or an enhanced-extended display identification data (E-EDID).

17. The non-transitory, computer-readable medium of claim 15, wherein the one or more computer-readable instructions further cause the control device to perform one or more further operations comprising:
transmitting the test command as a Bluetooth low energy signal.

18. The non-transitory, computer-readable media of claim 15, wherein the one or more computer-readable instructions further cause the control device to perform one or more further operations comprising:

detecting the audio content from the media device, wherein the verification is based on the detection of the audio content.

19. The non-transitory, computer-readable media of claim 15, wherein the one or more computer-readable instructions further cause the control device to perform one or more further operations comprising:
   selecting an additional program code set;
   transmitting the additional program code set to the remote control device;
   transmitting an additional test command to the remote control device, wherein the additional test command is based on the additional program code set; and
   verifying the additional program code set based on monitoring of additional audio content from the media device.

20. The non-transitory, computer-readable media of claim 15, wherein the one or more computer-readable instructions further cause the control device to perform one or more further operations comprising:
   outputting a test audio content to the media device;
   detecting an output from the media device;
   comparing the output to the test audio content; and
   determining that the media device is in communication with the control device based on the comparison.

* * * * *